Oct. 17, 1939.  J. P. SPANG  2,176,751
MEAT-SLITTING MACHINE
Filed Dec. 17, 1937  5 Sheets-Sheet 1

Inventor.
Joseph P. Spang
by Heard Smith & Tennant.
Attys.

Oct. 17, 1939.  J. P. SPANG  2,176,751
MEAT-SLITTING MACHINE
Filed Dec. 17, 1937   5 Sheets-Sheet 2

Inventor.
Joseph P. Spang
by Heard Smith & Tennant.
Attys.

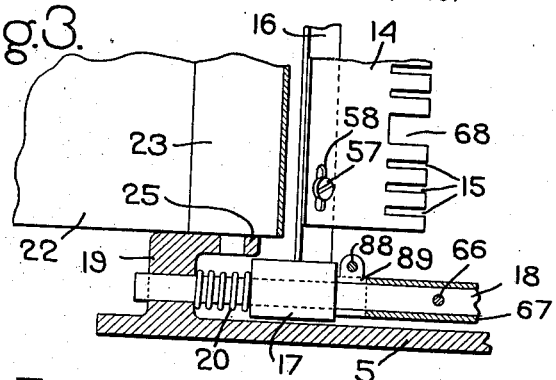
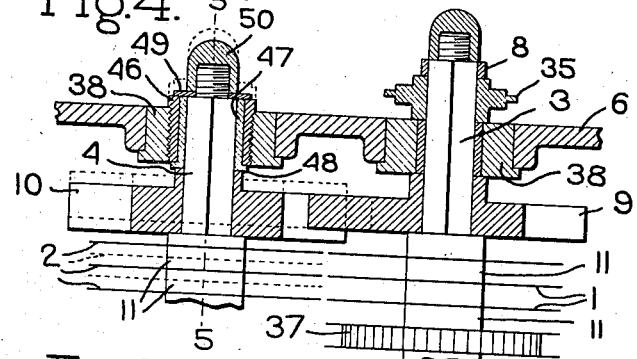
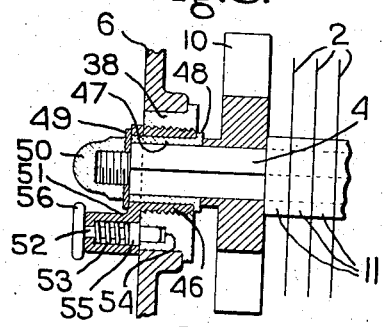
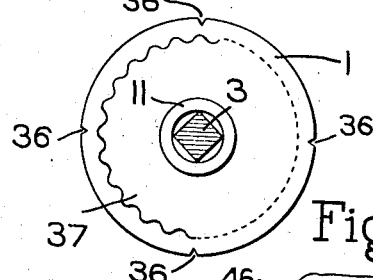
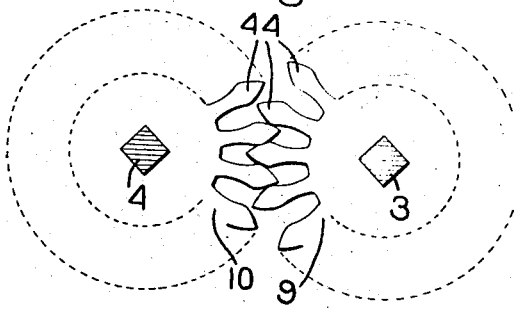
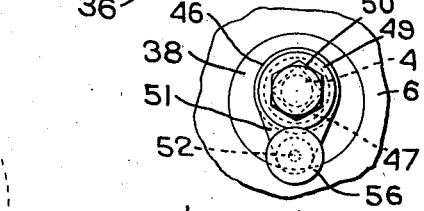

Oct. 17, 1939.    J. P. SPANG    2,176,751
MEAT-SLITTING MACHINE
Filed Dec. 17, 1937    5 Sheets-Sheet 4

Inventor.
Joseph P. Spang
by Heard Smith & Tennant
Attys.

Oct. 17, 1939.    J. P. SPANG    2,176,751
MEAT-SLITTING MACHINE
Filed Dec. 17, 1937    5 Sheets-Sheet 5
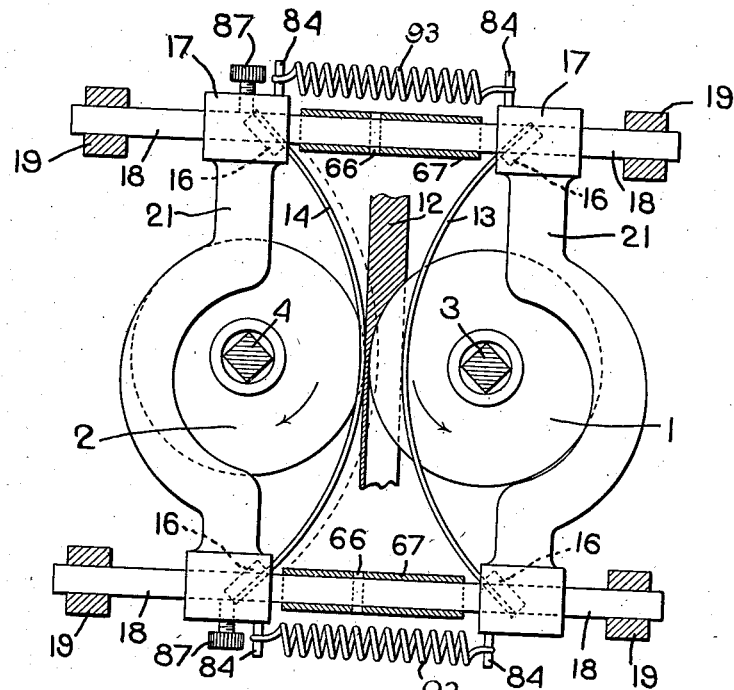
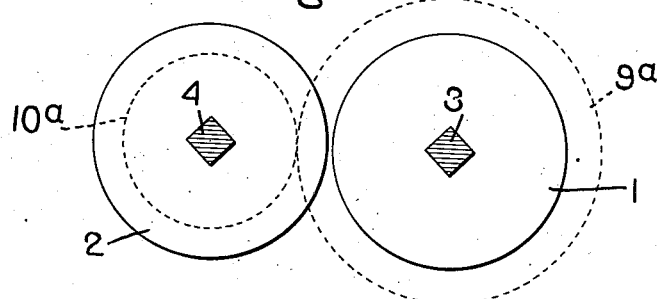

Patented Oct. 17, 1939

2,176,751

UNITED STATES PATENT OFFICE 2,176,751

MEAT-SLITTING MACHINE

Joseph P. Spang, Quincy, Mass.

Application December 17, 1937, Serial No. 180,368

15 Claims. (Cl. 17—26)

This invention relates to meat-slitting machines and has for its object to provide improvements in meat-slitting machines which will be more fully hereinafter set forth and then pointed out in the appended claims.

In the drawings wherein I have illustrated some selected embodiments of my invention;

Fig. 3 is a fragmentary sectional view of the stripper member showing the manner in which it is mounted and adjusted;

Fig. 4 is a fragmentary sectional view taken on the plane of the axes of the shafts 3 and 4, the shafts and the knives being shown in plan.

Fig. 5 is a section on the line 5—5, Fig. 4;

Fig. 6 is a transverse section through the shaft 3 showing a knife and feed disk in elevation.

Fig. 7 is a fragmentary view showing one form of driving connection between the two knife shafts;

Fig. 8 is a fragmentary view showing the means for adjusting one of the knife shafts in the direction of its length;

Fig. 11 is a fragmentary sectional view showing a slightly different embodiment of the invention and illustrating an adjustment of the device by which the meat is slit on one side only;

Fig. 12 is a view of the stop collar hereinafter referred to;

Fig. 13 is a diagrammatic view illustrating a construction which may be used where the knives of the two sets are to be rotated at different peripheral speeds.

Figure 1:
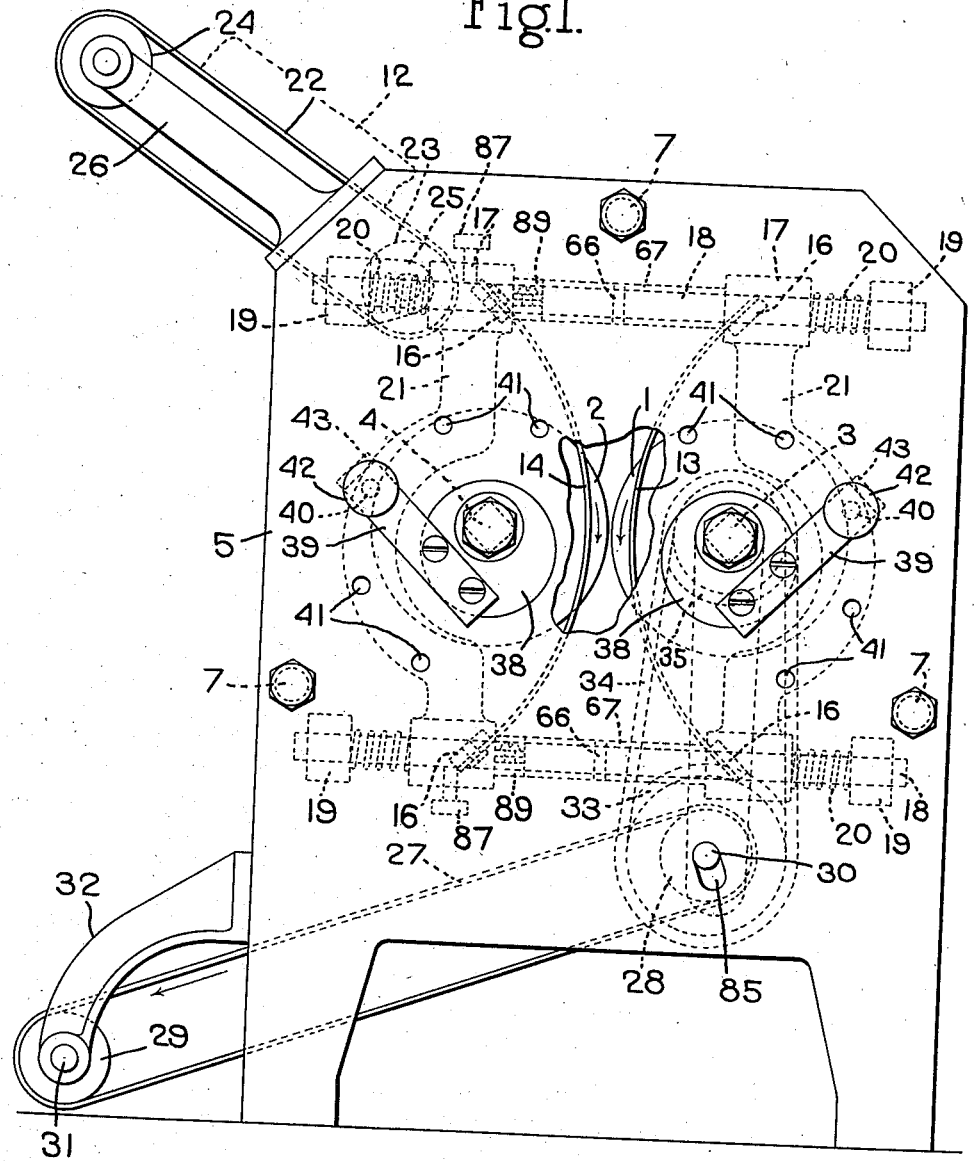
Fig. 1 is a side view of a machine embodying my invention.

The meat-slitting machine herein shown is of that type which embodies in its construction two sets of rotary slitting knives situated opposite each other and between which the slice of meat to be slit is fed, one set of knives operating to cut slits in one side of the slice, and the other set of knives operating to cut slits in the other side of said slice. The two sets of rotary knives are indicated at 1 and 2, the knives of both sets being disk knives. The knives 1 are carried by a knife shaft 3 and the knives 2 are mounted on and carried by a knife shaft 4; the knives on each shaft being suitably spaced by means of spacing collars 11. These two knife shafts are mounted in a suitable frame which comprises two vertical end members 5 and 6 which are suitably connected by tie rods 7, and between which the two sets of knives 1 and 2 are located. The knife shafts 3 and 4 may be rotated by any suitable means, that is, either by power or manually. I have herein shown means for manually rotating the knives, and for this purpose one end of the knife shaft 3 extends through the end member 6 of the frame and has fast thereto a crank 8 by which it may be manually operated and the two knife shafts 3 and 4 are geared together by suitable intermeshing gears 9 and 10 which are mounted on said shafts 3 and 4 respectively.

The knife shafts 3 and 4 are arranged in the same horizontal plane and the slice 12 of meat to be slit is fed downwardly between said knives from the upper part of the frame.

Associated with the knives are two combined slice guiding and stripper members 13 and 14, each member being in the form of a convexly curved plate having slots 15 through which the knives project. These guiding and stripper plates 13 and 14 are arranged with the convex surfaces of each facing the other as best seen in Fig. 1 and said members thereby provide a converging throat into which the slice 12 is fed. The members 13 and 14 are so spaced that as the meat passes between them they will exert a frictional drag on both sides of the meat. The knives are rotated in the direction of the arrows, Fig. 1, and the rotation of the knives tends to pull the slice of meat downwardly but the frictional drag of the members 13 and 14 on the slice tends to retard the movement so that the knives will operate on the meat with a draw cut.

One of the guiding members, the guiding member 13 in the illustrated embodiments of the invention, is mounted so as to be capable of yielding movement toward the shaft 3, and the mounting for the other guiding member 14 is such that said member may also have a yielding movement, or said member may be clamped in a fixed position, depending upon the manner in which it is desired to slit the meat.

Said member 14 is also capable of adjustment toward and from the axes of the knife shafts. When the member 14 is mounted to have a backward yielding movement then the passage of the slice 12 of meat between said members 13 and 14 will cause the meat to be slit on both sides. By properly adjusting the position of the member 14 and then clamping it fixedly in position the machine will be converted into one which will either make slits in one side only of the slice or one which will cut the slice into strips.

In the construction herein shown both of the members 13 and 14 are yieldingly mounted, but the invention would not be departed from if one of them only were thus yieldingly mounted. The members 13 and 14 are secured at their upper and lower edges to cross bars 16 extending transversely of the machine, each cross bar being secured at each end to a bushing 17 which is slidably mounted on a horizontal rod 18 that is supported in bosses 19 with which the end members 5 and 6 of the frame are provided. Each bushing 17 is backed by a spring 20 which is located between said bushing and the corresponding boss 19, said springs 20 providing a yielding backing for the members 13 and 14.

The bushings 17 for the upper and lower bars 16 are shown as rigidly connected by a yoke member 21 so that when pressure is applied to either member 13 or 14 by a slice of meat passing between said members the yielding moving movement of the member will take place evenly at the top and bottom thereof. Mounted on each rod 18 is a sleeve 67 which is held in fixed position on said rod by a pin 66 extending through the rod. These sleeves 67 cooperating with the bushings 17 serve as stops to limit the spring-pressed or forward movement of the member 13.

Each sleeve 67 is provided at its left-hand end (see Fig. 1) with a removable split collar member 89, which when in position as shown in Fig. 1, serves as a stop for the forward or spring-pressed movement of the guiding member 14. The two parts of the split collar member 89 (see Fig. 12) are held together by a clamping screw 88, the removal of which permits the collar member to be removed from the rod. When the collar members 89 have been thus removed the guiding member 14 is permitted to move forwardly into either the full line position, Fig. 11 or the dotted line position in said figure. Each of the bushings 17 of the guiding member 14 is provided with a set screw 87 by which the bushings can be locked to the rods 18, thereby holding the guiding member 14 rigidly in any desired position. With this construction the upper or receiving end of each guiding member is spaced a fixed distance apart from the lower or delivery end thereof, and when a thick slice of meat is passed between the guiding members they will be separated from each other by a bodily movement.

As stated above, when the collar members 89 are in place on the rods 18 as shown in Fig. 1 then the members 14 will be held in such position that the knives 2 will project through the slots thereof and any slice of meat passing between the two members 13 and 14 will be slit on both sides. When the collar members 89 are removed and the guiding member 14 is fixedly secured in the position shown in Fig. 11 by means of the set screws 87, then the knives 2 do not project through the member 14 and the slice 12 of meat passing between the members 13 and 14 will be slit on one side only as shown in Fig. 11.

If it desired to cut the slice 12 into strips then the guiding member 14 may be adjusted still further to the right, Fig. 11 into the dotted line position so that the knives 1 will project not only through the slots in the member 13 but also through the slots in the member 14, and with this arrangement the knives 1 will cut clear through the slice and divide it into strips.

Figure 2:
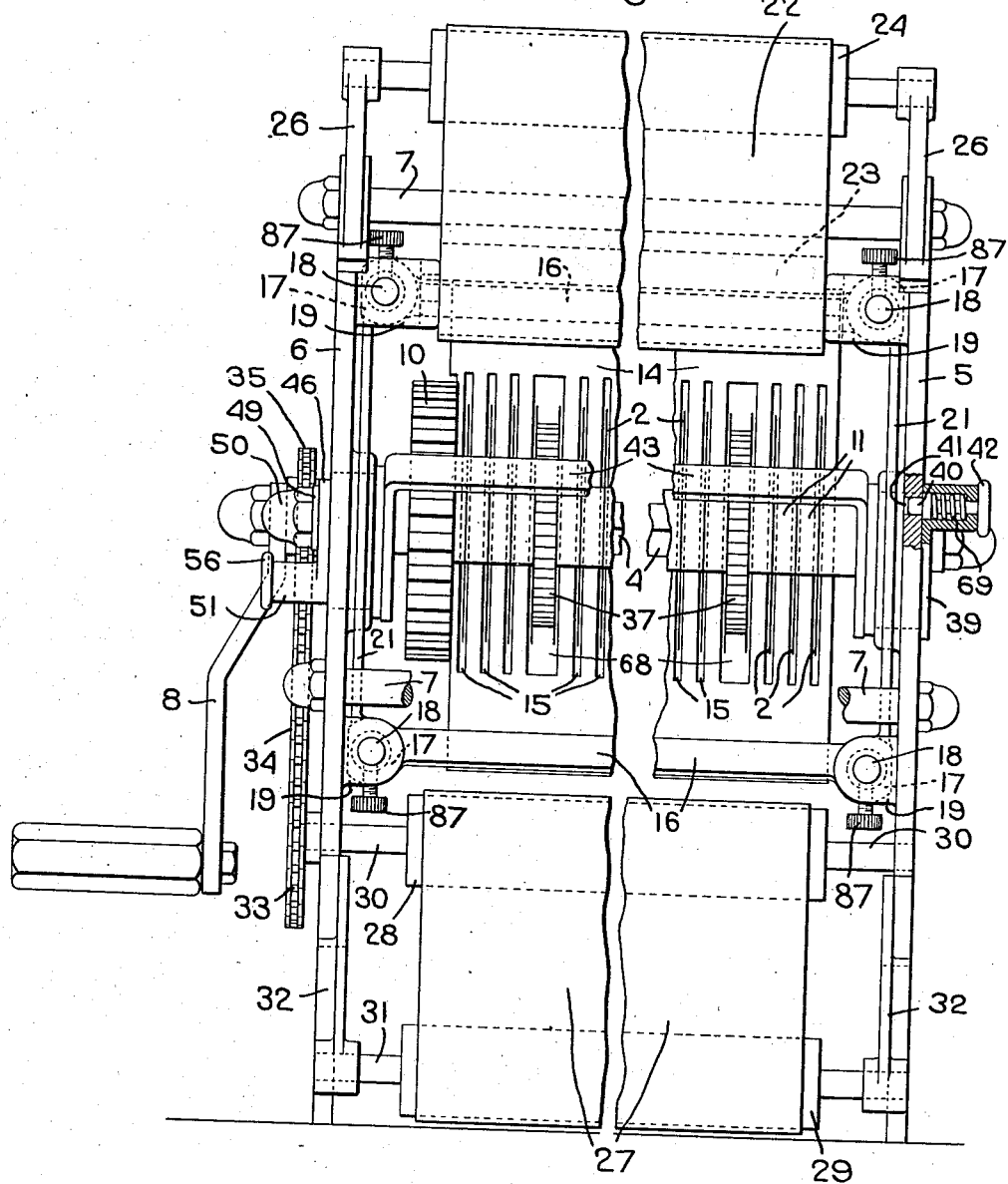
Fig. 2 is a view of the machine looking toward the right in Fig. 1.

In Figs. 1 and 2 I have shown an endless apron 22 by which the slices 12 of meat may be fed to the slitting knives. This endless apron is shown as passing around guide pulleys 23 and 24. The lower guide pulley 23 is illustrated as journalled in ears 25 extending from one of the bosses 19 as best seen in Fig. 3, and the roll 24 is shown as journalled in a bearing at the upper end of arms 26 which are secured to and extend from the frame. This endless apron 22 is a freely movable apron, and in using the device the operator will place a slice 12 of meat on the upper run of the apron 22 and then push the slice downward, which will give feeding movement to the apron that will carry the slice off from the apron and onto the guiding member 14, said slice of meat then passing down between the members 13 and 14 and thus being operated on by the slitting knives 1 and 2.

Situated beneath the knives is a receiving endless apron 27 onto which the slit slice of meat is deposited. This receiving apron 27 passes around two direction pulleys 28, 29, and is constructed so that it will deliver the slit slice of meat from between the two sides 5 and 6 of the frame.

The ends of the shaft 30 of the guide roll 28 are journalled in the sides 5 and 6 of the frame. The shaft 31 of the guide roll 29 is journalled in suitable brackets 32 which are secured to the sides 5 and 6 of the frame.

Means are provided for operating the receiving apron 27 to cause the upper run thereof to move in the direction of the arrow in Fig. 1 for the purpose of positively delivering the slit meat from the machine, and for this purpose the shaft 30 of the roll 28 has a sprocket wheel 33 fast thereon which is connected by a sprocket chain 34 to a sprocket wheel 35 that is fast on the knife shaft 3.

In the operation of this machine the feeding of the slice of meat past the knives is accomplished partly by the action of gravity and partly by the friction of the knives on the meat. In order that the knives may exert a sufficient feeding movement to the meat to overcome any frictional drag of the stripper members against the meat I may, if desired, make the knives with notches 36 in their peripheries, as shown best in Fig. 6. If desired, I may also mount one or more feed disks 37 on each shaft, said disks being situated between the knives and each preferably having a serrated or undulating periphery as shown in Fig. 6. These feed disks 37 act as feed wheels to positively feed the meat forward, and the guiding members 13 and 14 are provided with wide slots 68 to accommodate said disks.

The knife shafts 3 and 4 are mounted in the frame so that they can be adjusted toward and from each other thereby to vary the depth of the slits which are made in each side of the meat. For this purpose each end of each shaft is journalled eccentrically in a bushing 38 which is mounted for turning movement in the end member of the frame, the shafts being so mounted in the bushings that the shaft axis is off center from the axis of the bushing. Each bushing 38 has secured thereto an arm 39 by which it may be turned in the end frame and because of the eccentric mounting of the shafts 3 and 4 in the bushings the turning of the bushings will move the shafts toward and from each other. Each arm 39 carries at its end a spring-pressed locking pin 40 which is adapted to engage in anyone of a plurality of holes 41 with which the end member of the frame is provided. The locking pin 40 has a head 42, and by grasping said head and pulling backwardly on the pin it can be disengaged from an aperture 41, and then by swinging the arm 39 the bushing 38 may be turned to provide the desired adjustment of the shaft. After the adjustment is made the bushing will be locked in its adjusted position by the engagement of the locking pin 40 with one of the holes 41. Each pin 40 is acted on by a spring 69 which yieldingly holds it in operative position.

There is a similar eccentric bushing at each end of each shaft and the two bushings for each shaft are connected together by a yoke member 43 so that when the bushing at one end of the shaft is turned the turning movement will be communicated through the yoke 43 to the bushing at the other end of the shaft.

The gears 9 and 10, by which the two shafts 3 and 4 are connected, are shown as having long teeth 44 (see Fig. 7). The purpose of this construction is to provide for the adjustment of the shafts.

In order to maintain a proper operating driving connection between the sprocket wheels 35 and 33 in all adjusted positions of the shaft 3, I have shown the end members 5 and 6 of the frame as provided with slots 25 in which the ends of the shaft 30 of the roll 28 are received. These slots permit vertical movement of the roll 28 as the shaft 3 is adjusted by means of its bushings 38.

I have also provided herein means for adjusting the knife shafts 3 and 4 relative to each other in the direction of their lengths, with the result that the two shafts may be relatively adjusted so that the knives on one shaft will be situated opposite to those on the other shaft, or so that the knives on one shaft will be staggered relative to those on the other shaft. To provide for such adjustment I propose to make the shaft 4 capable of adjustment in the direction of its axis, and for this purpose one end of the shaft 4 is journalled in a sleeve 46 which is screw-threaded into the corresponding bushing 38, the sleeve 46 being held from movement longitudinally of the shaft but capable of turning movement relative thereto.

As shown in Fig. 4, one end of the shaft 4 extends through an inner sleeve 47 which is mounted for rotation in the screw-threaded sleeve 46, said inner sleeve 47 having at one end a flange 48 which engages the inner end of the screw-threaded sleeve 46, the outer end of said sleeve being engaged by a collar 49 which is locked to the shaft 40 by a cap nut 50.

Means are provided for turning the screw-threaded sleeve 46 within the bushing 38 and the screw-threaded engagement between the sleeve and the bushing will cause the sleeve to screw into or out of the bushing. Since the sleeve 46 is so connected to the shaft that it can have no movement longitudinally of the shaft, such movement of the sleeve in the direction of the axis of the shaft will shift the shaft longitudinally and thereby shift the position of the knives 2 thereon relative to the position of the knives 1 on the shaft 3.

The screw-threaded sleeve 46 is provided with an extension 51 in the form of a boss which carries a spring-pressed locking pin 52 which is acted on by a spring 53 situated within the boss 51 and is adapted to engage an aperture 54 with which the bushing 38 is provided. The spring 53 of the locking pin is confined between a collar 55 fast thereon and the end wall of the spring-receiving recess in the bushing and said pin is provided with a head 56 by which it can be manipulated.

To adjust the screw-threaded sleeve 46 the locking pin 52 is withdrawn from engagement with its aperture 54 and then said pin and the boss 51 are used as a crank for turning the sleeve within the bushing, thereby to move the shaft 4 in the direction of its length. When the desired adjustment has been made the locking pin is again engaged in the aperture 54, thereby locking the sleeve from further movement. With this arrangement the shaft 4 may be positioned so that the knives 2 thereon stand opposite the knives 1 on the shaft 3 as shown in full lines, Fig. 4, or said shaft may be adjusted so that the knives 2 will have the dotted line position, Fig. 4. The gear 10 is wider than the gear 9 so that the adjusting of the shaft 4 longitudinally will not destroy the intermeshing relation of the gears. The end of the shaft 4 which is journalled in the end member 5 of the frame is so mounted as to permit it to have its longitudinal movement.

Inasmuch as the knives 2 project through the slots 15 in the guiding member 14 it is necessary to provide for adjusting said member 14 with the knives when the shaft 4 is adjusted longitudinally. For this purpose the member 14 is connected to each cross bar 16 by means of clamping screws 57 which extend through slots 58 in the member 14 and have screw-threaded engagement with the bar 16.

When the shaft 4 is to be adjusted longitudinally the screws 57 are loosened, thus permitting the guiding member 14 to be moved with the knives when the shaft is adjusted. After the adjustment is made the screws 57 may be tightened to lock the member 14 in its adjusted position.

In Fig. 7 the two gears 9 and 10, by which the two knife shafts are geared together, are shown as of the same size. If it is desired that one of the knives should rotate faster than the other, this end may be accomplished by making one of the two intermeshing gears by which the knife shafts are connected larger than the other as shown in Fig. 13, wherein the gear 9a on the knife shaft 3 has a larger diameter than the gear 10a on the knife shaft 4.

Figure 9:
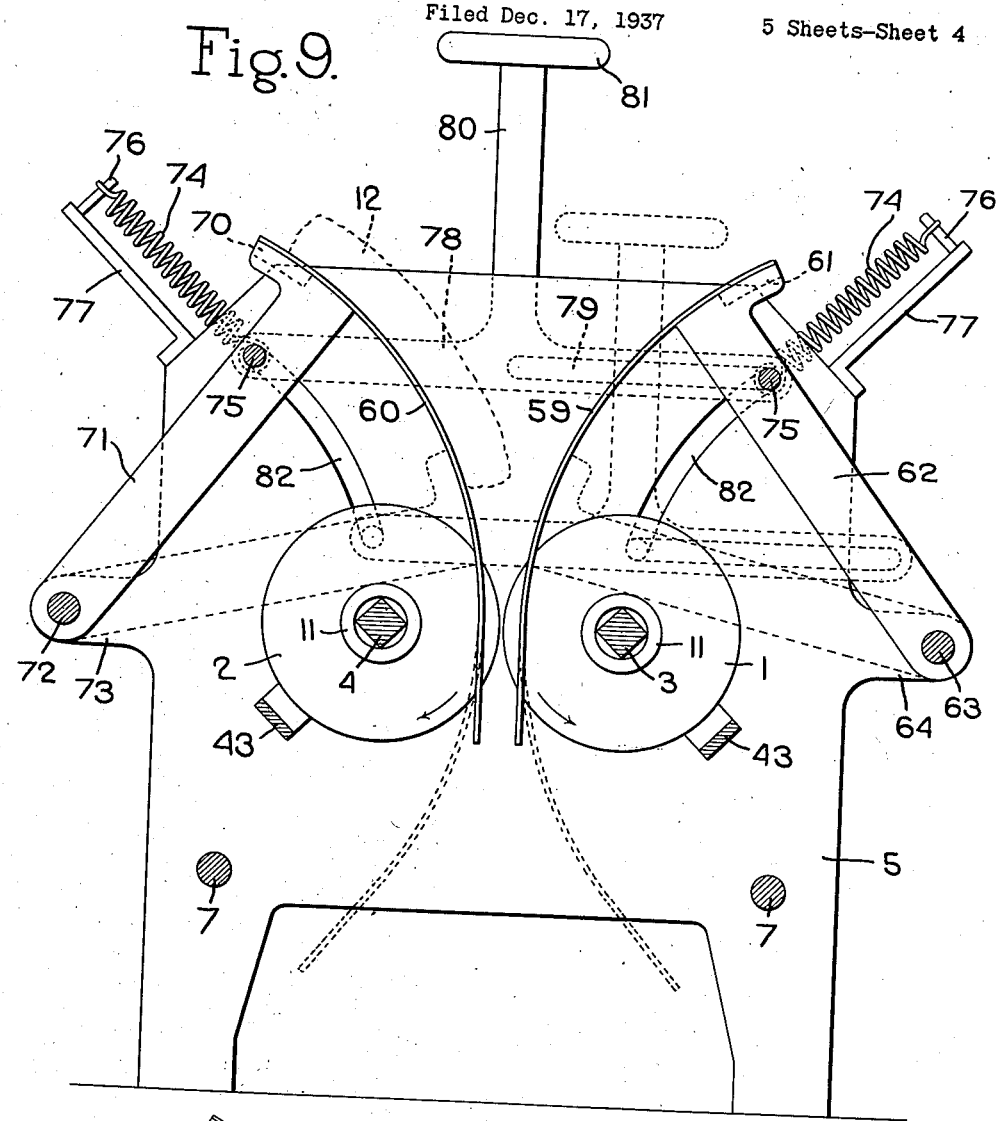
Fig. 9 is a vertical sectional view through a meat-slitting machine having a slightly different construction from that shown in Figs. 1 and 2.
Figure 10:
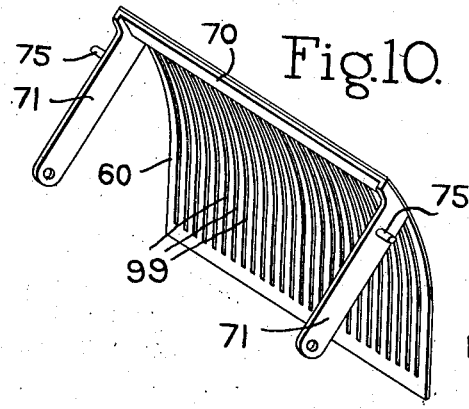
Fig. 10 is a perspective view of one of the meat-guiding members shown in Fig. 9.

In Fig. 9 I have shown an embodiment of the invention wherein the two combined guiding and stripper members serve also as slice-feeding members. In this embodiment the two sets of knives 1 and 2, the shafts 3 and 4 on which they are mounted and the frame members 5 and 6 in which the shafts are journalled have substantially the same construction as shown in Figs. 1 to 7.

In this embodiment of the invention, however, the combined guiding and stripper members, which are indicated at 59 and 60, are mounted so that they can be moved with the slice 12 of meat as the latter is fed to the slitting knives 1 and 2. Each member 59, 60 is in the form of a plate provided with slots 99 through which the knives 1 and 2 project. The member 59 is secured at its upper end to a bar 61 which extends transversely of the machine and is carried by two arms 62 mounted on a rock shaft 63 which is journalled in bearings 64 carried by the frame. The stripper plate 60 is similarly mounted upon a transverse bar 70 carried by two arms 71 fast on a rock shaft 72 which is also journalled in bearings 73 carried by the frame. The two members 59 and 60 are thus mounted so that they can swing from their full line position downwardly into the dotted line position, and when a slice 12 of meat is to be slit it will be placed on one of the members 59, 60 as shown in dotted lines, Fig. 9, and then the two members may be moved downwardly as the knives are rotated, thereby carrying the slice past the knives. It is intended that the slices to be slit will be of such a thickness that, as they pass between the two members 59, 60, the latter will have sufficient frictional engagement with the slice to insure its proper feeding movement.

I have illustrated in Fig. 9 a simple means for giving the members 59, 60 their meat-feeding movement. The swinging arm of each member is acted on by a spring 74 which normally holds the member in its elevated position, said spring being connected at one end to a pin 75 projecting from one of the swinging arms and being connected at its upper end to an anchoring pin 76 which is carried by a bracket 77. Pivoted on one of the pins 75 is an actuating bar 78 which is provided with a slot 79 in which is received the pin 75 projecting from the arm 62, and this bar 78 is shown as having an upstanding extension 80 provided with a head 81. A downward pressure on the head 81 will operate through the bar 78 and the pin 75 to swing the arms 71, 62 from their raised full line position into their lower dotted line position, thereby carrying the combined guiding and stripper members 59, 60 from their full to the dotted line position.

In using this device a slice 12 of meat will be placed on one of the guiding members 59 or 60 and then the operator will press downwardly on the head 81, this operation serving to feed the slice 12 between the knives, with the result that the knives will cut the desired slits in the opposite faces of the meat. After the meat has been delivered from the knives 1 the operator releases the pressure on the head 81 and the springs 74 will then raise the members 59, 60 into their full line position ready to receive another slice of meat.

If desired the device shown in Fig. 9 may be equipped with the delivery apron 27 which is shown in Fig. 1 and with the means for adjusting the knife shafts toward and from each other and also relative to each other in the direction of their length which is shown in Figs. 1 to 8.

The first pass of each slice through the knives will cut a series of parallel slits in each side of the meat, and if it is desired to cut in the meat on each side a second series of slits crossing those of the first series, then after a slice of meat has passed once through the knives, said slice will be given a second pass through the knives but in a position in which series of slits made during the first pass will cross those made during the second pass.

In the embodiment of the invention shown in Fig. 1 the yielding movement of the guiding members 13 and 14 is provided for by the springs 20 which encircle the rods 18 and are confined between the bushings 17 and the bosses 19. In Fig. 11 I have shown a slightly different construction wherein the two bushings 17 on each rod 18 are connected by a pulling spring 93, said spring being anchored at its ends to pins 84 rising from the bushings. These springs 93 function in the same way to provide the yielding movement of the members 13, 14 as the springs 20 do in Fig. 1.

I claim:

1. A machine for slitting meat comprising two sets of rotary slitting knives, means to rotate said knives, a combined slice-guiding member and stripper for each set of knives, said guiding members forming between them a throat through which a slice to be slit is fed, and means supporting each guiding member with its receiving and delivery end spaced a fixed distance apart, the supporting means for one of the guiding members being mounted for yielding movement away from the supporting means for the other guiding member, whereby the former guiding member may have a bodily yielding movement toward the axis of the corresponding set of knives.

2. A machine for slitting meat comprising two sets of rotary slitting knives, means to rotate said knives, a combined slice-guiding member and stripper for each set of knives, said guiding members forming between them a throat through which the slice to be slit is fed, and means supporting each guiding member with its receiving and delivery ends spaced a fixed distance apart, the supporting means for each one of said guiding members being mounted for bodily yielding movement away from each other.

3. A meat-slitting machine comprising two sets of rotary slitting knives, means to rotate the knives, a combined slice-guiding member and stripper for each set of knives, each guiding member being in the form of a curved slotted plate, means supporting said plates in position with the knives projecting through the slots thereof, and said plates forming between them a throat through which a slice to be slit is fed, the supporting means for one of said plates being yieldingly movable in a direction away from the supporting means for the other plate.

4. A meat-slitting machine comprising a frame, two sets of rotary slitting knives carried thereby, means to rotate said knives, a combined meat-guiding and stripper member for each set of knives, each guiding member being in the form of a curved slotted plate, bars extending transversely of said frame to which said plates are secured, a sleeve secured to each end of each bar, rods carried by the frame on which said sleeves are slidably mounted, and springs carried by the rods and forming a yielding backing for the sleeves.

5. A meat-slitting machine comprising two parallel knife shafts, a set of rotary knives on each shaft, the knives of each set being spaced from each other, means for rotating the shafts, means for guiding a slice of meat between the two sets of knives, and means for adjusting the two sets of knives relatively in a direction parallel to the axes of rotation thereof, thereby to place the two sets of knives in relative positions with the knives of one set either in line with those of the other set or staggered relative thereto, said adjusting means serving of itself to hold the shafts in their relative adjusted positions.

6. A meat-slitting machine comprising two parallel knife shafts, a set of rotary knives on each shaft, means for rotating the shafts, means for guiding a slice of meat between the two sets of knives, and means for adjusting one shaft relative to the other in the direction of its length into either a position in which the knives of the two shafts are in line with each other or into a position in which the knives on one shaft have a staggered relation to those on the other shaft, said adjusting means serving of itself to hold the adjustable shaft in either of its two positions.

7. A meat-slitting machine comprising a frame, two parallel knife shafts rotatably mounted therein, a set of rotary knives on each shaft, means to rotate the shafts, means for guiding a slice of meat between the two sets of knives, and means accessible on the outside of the frame at one end of the shafts for relatively adjusting the two sets of knives both toward and from each other and means accessible on the outside of the frame at the other ends of the shafts to adjust said shafts relatively in the direction of their axes of rotation.

8. A meat-slitting machine comprising two parallel knife shafts, a set of rotary knives on each shaft, means for rotating the shafts, means for guiding a slice of meat as it is fed between the two sets of knives, means operable from one end of one shaft for adjusting said shaft toward and from the other shaft, and means operable from the other end of said shaft for adjusting it relative to the other shaft in the direction of its length.

9. A meat-slitting machine comprising two sets of rotary knives having parallel axes, means to rotate the knives, a combined slice-guiding and stripper plate associated with each set of knives, each plate being curved and having slots through which the corresponding knives project, and said plates forming between them a vertical converging throat through which the slice to be slit is fed, and means for moving said plates downwardly thereby to carry the slice past the knives.

10. A meat-slitting machine comprising two sets of rotary knives having their axes in the same horizontal plane, means to rotate the knives, a combined slice-guiding and stripper plate associated with each set of knives, each plate being curved and having slots through which the corresponding knives project, and said plates forming between them a vertical converging throat through which the slice to be slit is fed, swinging arms on which said plates are carried, springs normally holding said plates in elevated position, and means for moving the plates downwardly thereby to feed a slice of meat between the knives.

11. A meat-slitting machine comprising a frame, two sets of rotary slitting knives carried thereby, means to rotate said knives, a combined meat-guiding and stripper member for each set of knives, each guiding member being in the form of a curved slotted plate, bars extending transversely of said frame to which said plates are secured, a sleeve secured to each end of each bar, rods carried by the frame on which said sleeves are slidably mounted, and springs acting on said sleeves and operating to hold the guiding members yieldingly against the slice as it is being slit.

12. A meat-slitting machine comprising a frame, two sets of rotary slitting knives carried thereby, means to rotate said knives, a combined meat-guiding and stripper member for each set of knives, each guiding member being in the form of a curved slotted plate, bars extending transversely of said frame to which said plates are secured, a sleeve secured to each end of each bar, rods carried by the frame on which said sleeves are slidably mounted, and springs connecting the sleeves carried by each rod and acting to hold the guiding members yieldingly against the slice as it is being slit.

13. A machine for slitting meat comprising two sets of rotary slitting knives between which the meat is fed, means to rotate said knives, a combined slice-guiding member and stripper for each set of knives, said guiding members forming between them a throat through which the slice to be slit is fed, one of said guiding members being mounted for bodily yielding movement toward the axis of the corresponding set of knives and the other guiding member being bodily adjustable toward and from the axis of the other set of knives, and means to secure said other guiding member fixedly in adjusted position.

14. A machine for slitting meat comprising a frame, two knife shafts rotatably mounted therein, a set of disk knives on each shaft, means to rotate said shaft, means for guiding a slice of meat in its movement between the sets of knives, and an exteriorly screw-threaded sleeve having screw-threaded engagement with the frame, one of the shafts having one of its ends journaled in said sleeve and the sleeve and shaft being held from movement relative to each other in an axial direction, said sleeve having a finger grip by which it may be rotated in the frame thereby to adjust the last-named shaft relative to the other shaft in the direction of its length.

15. A meat slitting machine comprising a frame, two parallel knife shafts rotatably mounted therein, a set of disk knives on each shaft, means to rotate the shafts, means for guiding a slice of meat between the two sets of knives, two shaft-supporting bushings mounted in the frame, one at each end of one of the shafts, said shaft being journaled in the bushings eccentrically thereof, an exteriorly screw-threaded sleeve having screw-threaded engagement with one of the bushings and through which said shaft passes, means for turning the bushings in the frame, thereby to adjust said shaft toward and from the other shaft, and means for rotating the screw-threaded sleeve thereby adjusting said shaft in an axial direction.

JOSEPH P. SPANG.